(No Model.)
J. BRUSIE.
WHEEL ATTACHMENT FOR BICYCLES.
No. 359,126. Patented Mar. 8, 1887.
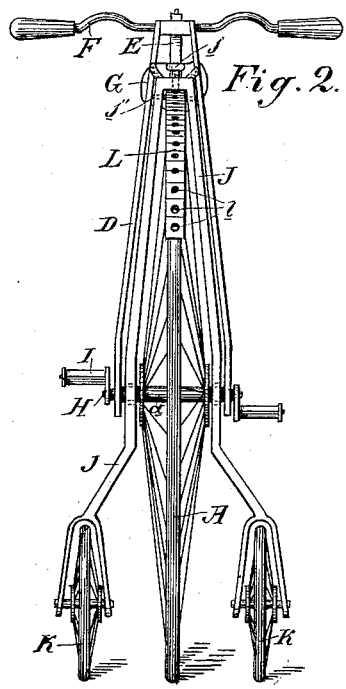
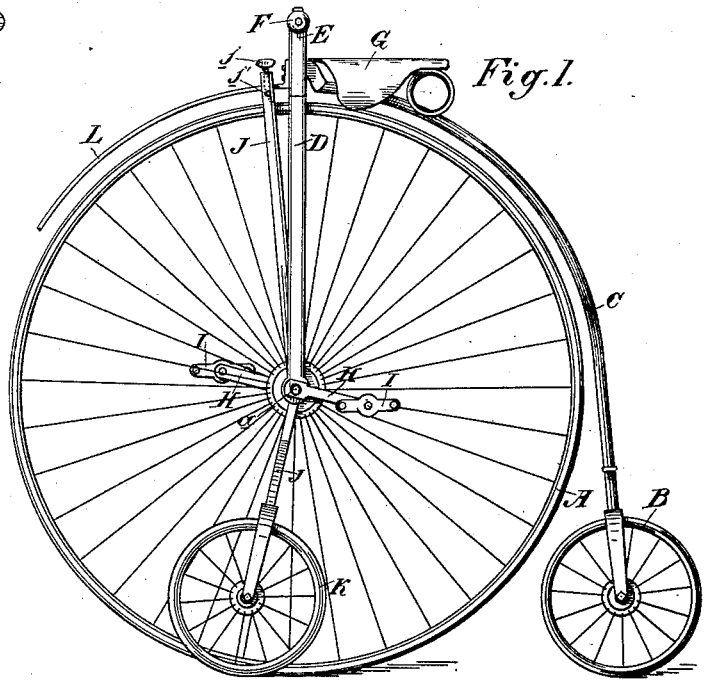
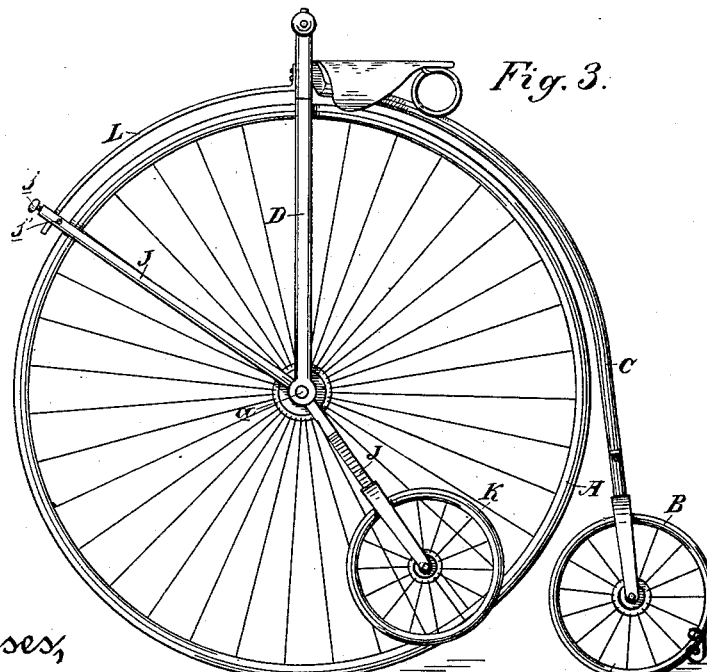

United States Patent Office.

JAMES BRUSIE, OF OAKLAND, CALIFORNIA.

WHEEL ATTACHMENT FOR BICYCLES.

SPECIFICATION forming part of Letters Patent No. 359,126, dated March 8, 1887.

Application filed July 19, 1886. Serial No. 208,492. (No model.)

*To all whom it may concern:*

Be it known that I, JAMES BRUSIE, of the city of Oakland, county of Alameda, and State of California, have invented an Improvement in Wheel Attachments for Bicycles; and I hereby declare the following to be a full, clear, and exact description thereof.

My invention relates to the class of bicycles; and my invention consists in adjustable auxiliary wheels located upon each side of the large wheel of the machine, and adapted by means of a lever, in which they are mounted, to be thrown down to contact with the ground in order to support the machine in an upright position when at a standstill, and to be moved up again out of the way when the machine is traveling, all of which I shall hereinafter fully describe.

The object of my invention is to provide practical means for supporting the machine in an upright position when at a standstill, in order to facilitate mounting and dismounting and to provide for a rest when desired.

Referring to the accompanying drawings, Figure 1 is a side elevation of a bicycle, showing the side wheels in position. Fig. 2 is a front elevation of same. Fig. 3 is a side elevation showing the side wheels raised out of the way when the machine is traveling.

A is the large wheel of the bicycle. B is the small wheel. C is the backbone. D are the forks. E is the steering-center. F is the handle-bar. G is the saddle; H, the cranks, and I are the treadles. These are all parts of every bicycle, and require no detailed description.

J is a long forked lever. Its legs are pivoted upon the axle $a$ of the front wheel in suitable positions, as at points between the hub-flanges of the wheel and the bearings of the axle, as shown in Fig. 2. The lower ends of the lever are bent outwardly to avoid the cranks, and are bifurcated in order to receive the small wheels K, which are mounted in suitable manner—say, for example, by similar journals as are employed for the small wheel B of the machine. The wheels K may be of any suitable character, though they need not be as strong as the small wheel B, for they do not receive the same wear and tear. They may, consequently, be much lighter, whereby the increased weight of the machine will be inappreciable.

The lever J embraces the front wheel, A, and is guided in its movement by a bar, L, the upper end of which is secured to the head of the machine in some manner. I have here shown it secured to the upper portion of the forks D. It is bent to the curvature of the wheel A, and is provided with a series of holes or indentations, $l$, which are for the purpose of receiving a set-screw or spring-bolt, $j$, in the upper end of the lever J, so that said lever may be adjusted and fixed in any desired position.

To further guide the lever, and also to provide a support for the curved guide-bar L, so that it will not have a tendency to settle down upon the tire of the wheel A, I pass a small pin or bolt, $j'$, transversely through the upper portion of the lever under the curved guide-bar.

The operation of my attachment is as follows: When the rider is about to mount the machine, he pulls the upper end of the lever J back and up to the position shown in Fig. 1. This movement of the lever throws the side wheels, K, down to the ground, and as they stand upon each side of the wheel A and at a little distance therefrom, they support the machine in an upright position. This support is made certain by setting the screw or bolt $j$ to its engagement with the guide-bar L. While the machine is at a standstill and upright, the rider may climb into the saddle with comfort and safety. When settled in his seat, with his feet upon the treadles ready to start, he may, if he be sufficiently expert, immediatly lift the side wheels, K, off the ground; otherwise he may start the machine while the wheels remain on the ground, and after gaining headway may then safely raise the wheels. This raising of the side wheels is effected by the rider reaching over to the top of the lever J, releasing the screw $j$, and forcing the lever forward, so that both lever and wheels assume the position shown in Fig. 3. He may then set the screw or bolt $j$, and thus hold the wheels K in this position. When he desires to rest or to dismount, he reaches forward again and pulls the lever up, so that the side wheels are thrown down to the ground and the machine brought to a standstill and supported in an upright position.

Having thus described my invention, what I claim as new, and desire to secure by Letters Patent, is—

1. In combination with a bicycle, the forked lever J, embracing the large wheel and pivoted on its axle, the small wheel K, mounted in the lower ends of the forked lever and on each side of the large wheel, and a fixed guide-bar upon which the upper end of the lever plays and to which it is adjustably secured, substantially as and for the purpose described.

2. In combination with a bicycle, the forked lever J, pivoted upon the axle of the large wheel of the machine, and embracing the wheel, the small wheels K, mounted in the lower ends of the lever on each side of the large wheel, the curved guide-bar L for the lever, secured to the head of the machine and extending over the large wheel, said bar having holes or indentations, and the set-screw or spring-bolt $j$ in the top of the lever for engaging the guide-bar, substantially as and for the purpose described.

In witness whereof I have hereunto set my hand.

JAMES BRUSIE.

Witnesses:
S. H. NOURSE,
H. C. LEE.